United States Patent
Bracken, Jr. et al.

[15] 3,688,497
[45] Sept. 5, 1972

[54] GAS TURBINE FUEL ATOMIZING SYSTEM

[72] Inventors: Joseph W. Bracken, Jr., Redford Twp.; Roger A. Davison; Glenn W. Thebert, both of Carmel, all of Mich.

[73] Assignee: General Motors Corporation, Detroit, Mich.

[22] Filed: March 31, 1971

[21] Appl. No.: 129,870

[52] U.S. Cl. .............................. 60/39.74 R, 60/39.23
[51] Int. Cl. .................................................. F02c 9/14
[58] Field of Search ......... 60/39.74 R, 39.74 S, 39.23

[56] References Cited

UNITED STATES PATENTS

| | | |
|---|---|---|
| 3,581,493 | 6/1971 | Sweet et al. ............ 60/39.74 R |
| 2,635,425 | 4/1953 | Thorpe et al. ............ 60/39.74 |
| 3,426,527 | 2/1969 | O'Connor ................. 60/39.74 |
| 3,224,195 | 12/1965 | Walsh ...................... 60/39.74 |
| 3,095,707 | 7/1963 | Flanigan et al. ........ 60/39.74 R |

Primary Examiner—Carlton R. Croyle
Assistant Examiner—Warren Olsen
Attorney—Paul Fitzpatrick and Jean L. Carpenter

[57] ABSTRACT

A gas-coupled regenerative gas turbine engine includes an air-assembled fuel atomizing nozzle in the combustion apparatus. Air is supplied to the nozzle by a positive-displacement pump driven by the engine. The pump has a relatively high ratio of clearance volume to displacement so that, at higher operating speeds of the engine, flow from the pump is blocked by the back pressure in the discharge line from the compressor of the engine. Thus air assist is available for starting and idling, but little energy is used by the pump at high power levels of the engine.

3 Claims, 4 Drawing Figures

PATENTED SEP 5 1972

3,688,497

INVENTORS.
Joseph W. Bracken, Jr.,
Roger A. Davison &
Glenn W. Thebert
BY Paul Fitzpatrick
ATTORNEY

GAS TURBINE FUEL ATOMIZING SYSTEM

DESCRIPTION

This invention is directed to an improved system for providing air to an air-assisted fuel atomizing nozzle of a gas turbine combustion apparatus.

A typical gas turbine fuel nozzle depends upon flow of fuel under pressure through small ports of the nozzle to atomize the fuel. This mode of atomization is quite satisfactory at high fuel flow rates but tends to become less effective at very low rates of fuel flow. Such flow rates of fuel flow are encountered in small gas turbine engines, and particularly in regenerative engines under low power or idling conditions.

One solution to this problem is to provide air under pressure slightly higher than that into which the fuel nozzle discharges to assist the atomization of the fuel by the air so supplied.

The supply of the air for atomization presents some problems to which the present invention is considered to be a solution superior to those previously proposed. In this connection, U.S. Pat. No. 3,095,707 of Flanigan et al., July 2, 1963, shows a fuel system for a gas turbine engine in which air to assist in fuel atomization is provided by a pick-up from the engine compressor under normal operating conditions, but is supplied by an auxiliary motor-driven pump during starting of the engine.

According to this invention, the air to aid in fuel atomization, which will hereafter be called atomizing air for conciseness, is supplied by a pump of a positive-displacement type driven by the engine, the pump being characterized by a relatively high clearance volume. This characteristic is so related to the characteristics of the engine that the pump supplies air for atomizing up to a desired level of operation, normally near full speed operation, and above this point the pump idles with the discharge blocked by the back pressure in the air line from the pump to the fuel nozzle communicated from the engine compressor.

The principal objects of the invention are to improve the fuel atomization in gas turbine engines, to provide an improved air-assisted fuel atomizing system, to provide an improved pumping arrangement for supplying air for fuel atomization, to provide a pump arrangement which is effective at low speeds of operation of the engine but which absorbs very little power during normal operation of the engine, and to provide an efficient pumping arrangement for supplying atomizing air which need not be decoupled from the engine but which absorbs very little power when not needed.

The nature of the invention and its advantages will be clear to those skilled in the art from the succeeding description of the preferred embodiment of the invention and the accompanying drawings thereof.

Figure 1:
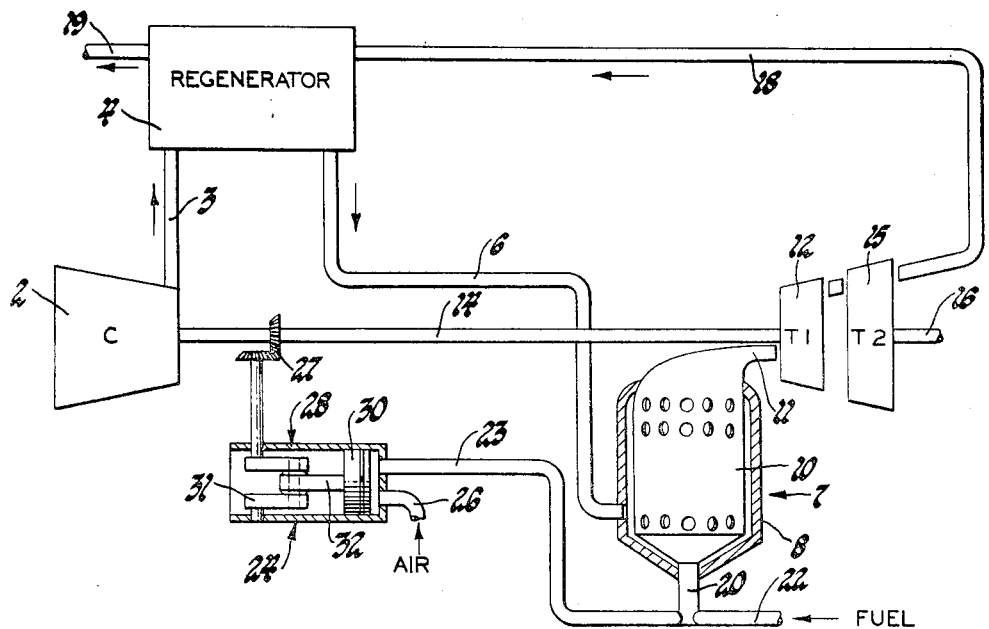
FIG. 1 is a schematic diagram of a gas turbine engine embodying the invention.

The engine may be of any known type and may, for example, be similar to any of those shown in the following U.S. patents: Amann et al., U.S. Pat. No. 3,116,605, Jan. 7, 1964; Collman et al., U.S. Pat. No. 3,267,674, Aug. 23, 1966; and Bell, U.S. Pat. No. 3,490,746, Jan. 20, 1970. Such an engine includes a compressor 2 which discharges through an outlet 3 into a regenerator 4 in which the compressed air is heated and from which it flows through conduit 6 to a combustion apparatus 7. The combustion apparatus may include an outer case 8 and a combustion liner 10. The motive fluid is heated by combustion of fuel in the combustion liner and the resulting combustion products are fed through a transition duct 11 to a compressor-driving or gas generator turbine 12 which drives compressor 2 through shafting 14. The exhaust from turbine 12 proceeds to a second or power turbine 15 which drives the output shaft 16. The exhaust from the turbine 15 flows through ducting 18, the regenerator 4, and an exhaust line 19 to atmosphere.

The combustion apparatus 7 includes a fuel nozzle 20 from which the fuel is sprayed into the combustion liner 10. The fuel is supplied from any suitable properly controlled source of fuel under pressure through a fuel line 23 to the nozzle. Atomizing air is supplied to nozzle 20 through an air line 23 from a pump 24. This pump has an atmospheric air intake indicated at 26 and is driven by the gas generator turbine through the reduction gearing and shafting indicated at 27.

The details of the fuel nozzle 20 are immaterial to this invention, which may be used with any suitable air assisted fuel nozzle. One such nozzle is illustrated in Grundman U.S. Pat. No. 3,310,240, Mar. 21, 1967. Others long have been commercially available. The pump 24 is indicated schematically in FIG. 1 as a piston type pump including a cylinder 28, a piston 30, a crankshaft 31, and a connecting rod 32 by which the piston is reciprocated.

Figure 4:
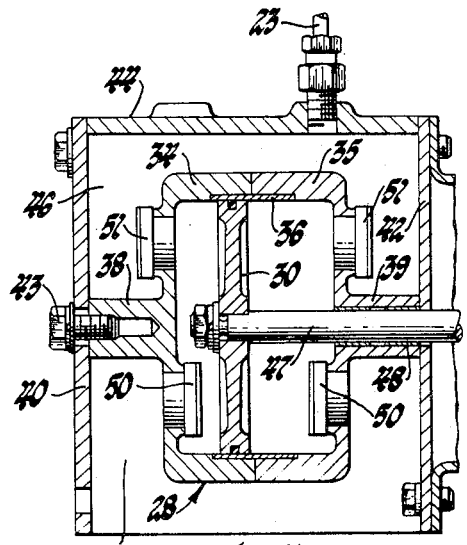
FIG. 4 is a sectional view, taken along the axis of the cylinder, of a double-acting piston type atomizing air pump cylinder.

Because of its desirable characteristics for the system, the preferred type pump is a double-acting positive displacement pump of the piston and cylinder type. Such pumps are well known and the design of them is fully understood. Structure of a preferred type pump according to the invention is further illustrated in FIG. 4. In FIG. 4, the cylinder 28 is shown as being defined by two cast heads 34 and 35 suitably held together in face to face relation and with a liner or bushing piloted within the two heads and providing a surface against which the piston 30 slides. The 34 and 35 34 are integral with webs 38 and 39 which are suitably fixed to end plates 40 and 42 as by the cap screw 43 and other cap screws not illustrated. A wall 44, which extends from one plate 40 to the other plate 42 and is fixed to the webs 38 and 39, defines with them a compressed air discharge chamber or plenum 46 which encloses about half of the circumference of the cylinder 28. The piston 30 is fixed to a reciprocating piston rod 47 guided in the web 39 by a bushing 48. This rod is suitably connected by a connecting rod (not illustrated) to a crank 31 so that the piston is reciprocated by the crank. Atmospheric air can enter the pump cylinder 28 from the space 26 through conventional reed-type inlet valves 50, one on each head, and the air is exhausted from the cylinder through conventional reed-type outlet valves 51 mounted on each cylinder head. The outlet valves discharge into the plenum 46 from which the air flows through the compressed air line 23 to the fuel nozzle.

The air pump is driven off the accessory drive gearing of the gas turbine engine at a speed much reduced from that of the gas generator turbine. In a particular pump adapted for use with an engine of about 300 horsepower rating, the piston is 3½ inches in diameter and the stroke is about six-tenths inch. The average clearance at the ends of the cylinders is also about six-tenths inch, so that the clearance volume is quite large with respect to the displacement as compared to ordinary expansible chamber air pumps. The pump is thus effective up to a little better than two to one compression ratio.

Figure 3:
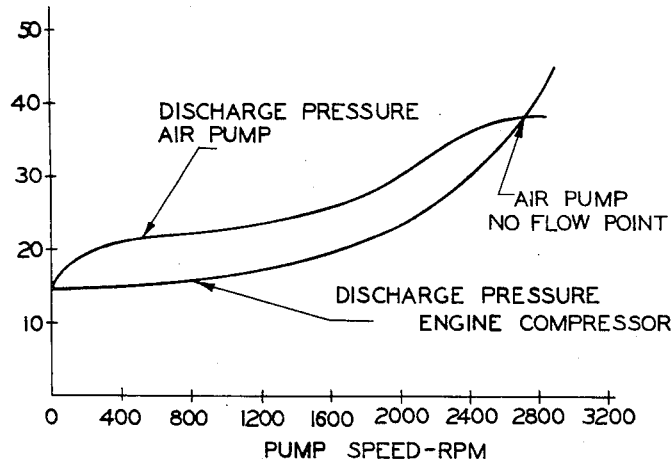
FIG. 3 is a graph illustrating the air pressure characteristics of the air pump and engine compressor.

As illustrated in FIG. 3, the discharge pressure of the engine compressor 2 rises from atmospheric at zero engine speed to a value of about three times atmospheric at full speed. The discharge pressure of the air pump rises rapidly at low pump speeds, and then slowly, and finally levels off at slightly below 40 pounds per square inch absolute. Where the discharge pressure curve of the pump crosses the engine compressor curve flow from the pump will cease because of the back pressure from the combustion chamber. As will be seen, the air pump discharge pressure is slightly higher than the engine compressor discharge pressure over a considerable range up to about 2,700 pump revolutions per minute.

Figure 2:
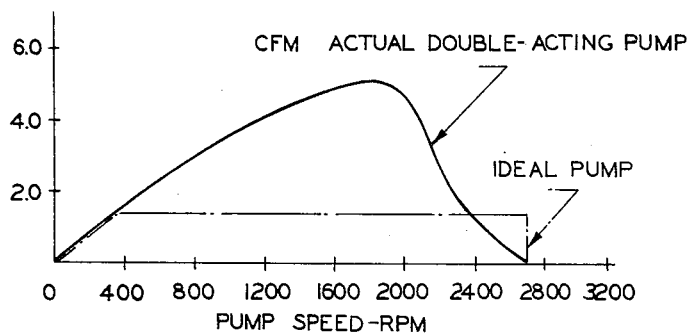
FIG. 2 is a graph of air flow from a preferred pump.

With the particular engine and nozzle for which the specific pump described was sized, an air flow of approximately 1½ cubic feet per minute at 5 pounds per square inch above combustion chamber pressure is desired for atomizing fuel at the lower engine speeds. The curve of FIG. 2 shows that the pump output rises to the desired value at below 300 pump rpm, which is below the point at which fuel is injected into the engine for starting. The capacity which rises to about 5 cubic feet per minute and then declines so that at approximately 2,700 rpm of the pump the flow ceases.

This pump characteristic could be obtained with a single-acting pump but the double-acting pump is desirable since at the higher speeds the piston oscillates in a mass-elastic system with the air being alternately compressed and rarified on each side of the piston. The result is that there is very little energy imparted to the air, which is simply being cyclically expanded and compressed, and therefore no troublesome heating of the pump or loss of energy due to pumping losses. The pump may simply be air cooled and the energy requirement is small. It will be apparent, of course, that no air flow control or shutoffs, relief valves, or other such gear is required; that the system as a whole is both simple and reliable.

Because of the relatively large piston area of the pump, it is capable of supplying the needed air at quite low engine speed. On the other hand, because of the high clearance volume, the energy input and air pressure do not increase to undesirable values at higher speeds.

It will be clear that various types of positive-displacement pumps may be used, and that the invention is applicable to various gas turbine cycles.

The detailed description of preferred embodiments of the invention for the purpose of explaining the principles thereof is not to be considered as limiting or restricting the invention, as many modifications may be made by the exercise of skill in the art.

I claim:

1. A gas turbine engine comprising a compressor, combustion apparatus supplied by the compressor, a turbine energized by the combustion apparatus and connected to drive the compressor, and a fuel atomizing nozzle in the combustion apparatus supplying fuel to the combustion apparatus, the fuel nozzle being of an air-aided type and including a fuel inlet and an air inlet, in combination with means for supplying air to the said air inlet comprising an air pump of an expansible-chamber type driven by the turbine, the pump having an atmospheric inlet and having a ratio of clearance volume to displacement sufficiently high that pump output is terminated by compressor discharge pressure above a predetermined turbine speed indicative of ability of the fuel nozzle to atomize fuel effectively without air assistance.

2. A gas turbine engine comprising a compressor, combustion apparatus supplied by the compressor, a turbine energized by the combustion apparatus and connected to drive the compressor, and a fuel atomizing nozzle in the combustion apparatus supplying fuel to the combustion apparatus, the fuel nozzle being of an air-aided type and including a fuel inlet and an air inlet, in combination with means for supplying air to the said air inlet comprising an air pump of a positive-displacement type driven by the turbine, the pump having an atmospheric inlet and having a ratio of clearance volume to displacement sufficiently high that pump output is terminated by compressor discharge pressure above a predetermined turbine speed indicative of ability of the fuel nozzle to atomize fuel effectively without air assistance.

3. A gas turbine engine comprising a compressor, combustion apparatus supplied by the compressor, a turbine energized by the combustion apparatus and connected to drive the compressor, and a fuel atomizing nozzle in the combustion apparatus supplying fuel to the combustion apparatus, the fuel nozzle being of an air-aided type and including a fuel inlet and an air inlet, in combination with means for supplying air to the said air inlet comprising an air pump of a double-acting positive-displacement type driven by the turbine, the pump having an atmospheric inlet and having a ratio of clearance volume to displacement equal approximately to unity.

* * * * *

UNITED STATES PATENT OFFICE
CERTIFICATE OF CORRECTION

Patent No. 3,688,497  Dated September 5, 1972

Inventor(s) Joseph W. Bracken, Jr., Roger A. Davison, and Glenn W. Thebert

It is certified that error appears in the above-identified patent and that said Letters Patent are hereby corrected as shown below:

On the title sheet, addresses of the inventors should read
-- Joseph W. Bracken, Jr., Redford Twp, Michigan;
Roger A. Davis and Glenn W. Thebert, both of
Carmel, Indiana --

In the Abstract, line 2, "air-assembled" should read
-- air-assisted --.

Column 2, line 48, before the numeral "34" insert -- heads --;
line 49, delete the numeral "34".

Signed and sealed this 13th day of February 1973.

(SEAL)
Attest:

EDWARD M. FLETCHER, JR.
Attesting Officer

ROBERT GOTTSCHALK
Commissioner of Patents